Patented Oct. 5, 1937

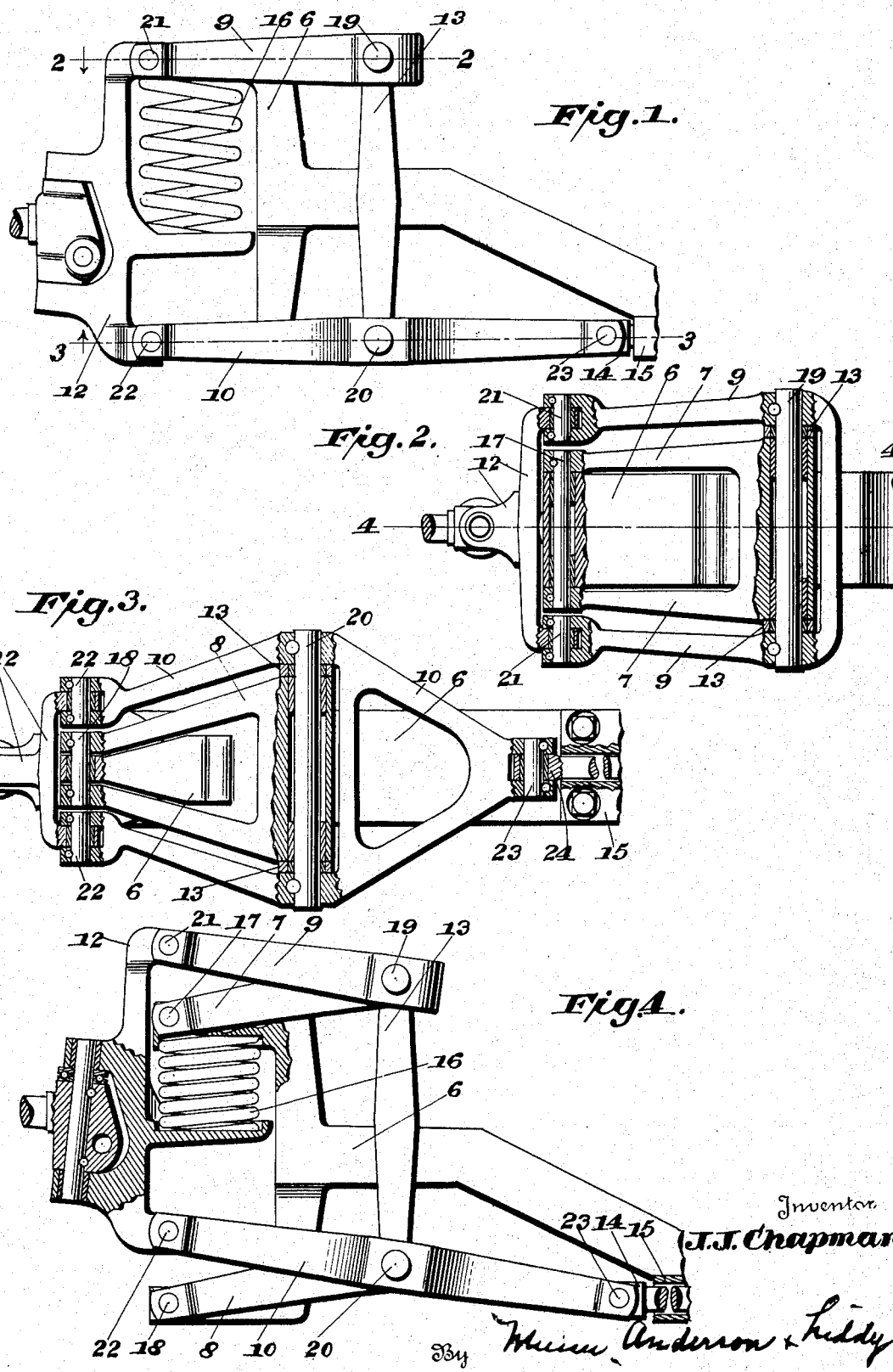

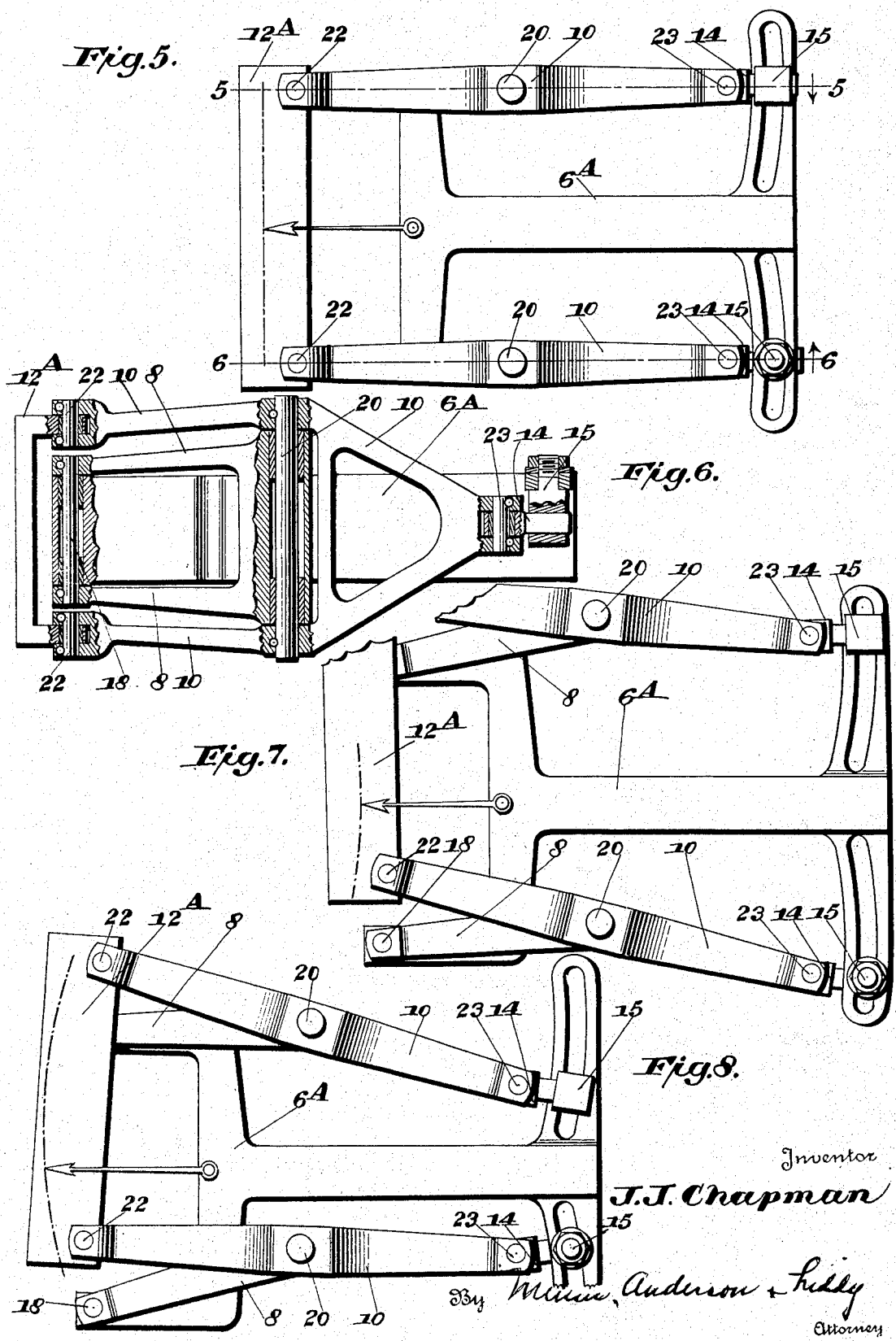
Oct. 5, 1937. J. J. CHAPMAN 2,094,582
ACTUATING MECHANISM FOR WHEEL SUSPENSIONS AND THE LIKE
Filed June 6, 1934 2 Sheets-Sheet 2

2,094,582

UNITED STATES PATENT OFFICE 2,094,582

ACTUATING MECHANISM FOR WHEEL SUSPENSIONS AND THE LIKE

James Judson Chapman, Elizabeth, La.

Application June 6, 1934, Serial No. 729,317

26 Claims. (Cl. 267—20)

An object of my invention is the production of a pivotally mounted vehicle wheel suspension that will allow a wheel mounted thereon to act independently of its companion wheel in its road, or spring, action, and while allowing freedom of movement substantially perpendicular to the base of the vehicle, maintains the line of travel of the said wheel, while so acting, in a straight line substantially perpendicular to the base of the vehicle and parallel to that of its companion wheel, thus maintaining the lines of travel of the said wheels at a substantially fixed distance, one from the other, thereby greatly reducing the usual gyroscopic disturbances and side-sway, and producing improved steering and driving conditions.

Another object of my invention is to provide a coil spring, or its equivalent, having one end mounted on a wheel supported member to which a spindle body is pivotally attached, in a seat recessed therefor, the upper end of the said spring, or its equivalent, bearing upwardly in a seat recessed therefor in the lower side of an upper arm of a bifurcated frame supporting member, to flexibly sustain the weight of the vehicle, and to maintain stability of the vehicle by being positioned adjacent the wheel.

Another important object of my invention is to provide a wheel supported member, to which a wheel assembly, not shown in the drawings, is pivotally attached, the said wheel supported member having a seat for the lower end of a coil spring, or its equivalent, and two upper and two lower fork arms horizontally apertured for flexibly connecting the said wheel supported member to a frame supporting member through means provided therefor.

Another important object of my invention is to provide a frame supporting member, having a substantially U-shaped end for the reception of a coil spring, or its equivalent, and a seat provided therefor and an upper and a lower fork arm horizontally apertured for flexibly connecting the said frame supporting member to a wheel supported member through means provided therefor.

Another important object of my invention is to provide means for flexibly connecting a wheel supported member to a frame supporting member that will admit of a straight line travel of the said wheel supported member, in its road, or spring, action, substantially perpendicular to the base of the vehicle to which it is attached, while maintaining the said wheel supported member in the said straight line of travel in its road, or spring, action, the said means therefor to be hereinafter more fully described.

Other objects and advantages of my invention will be apparent during the course of the following detailed description.

In the accompanying drawings, forming a part of this specification, and in which like reference characters designate like parts throughout the same:

Figure 1 is a front elevation of an independently acting, pivotally mounted, straight line travel automotive front wheel suspension showing its movable members in the center of their travel.

Figure 2 is a plan view of the structure shown in Figure 1, partly sectional, the sections being taken on the line 2—2 of Figure 1, the lower link assembly 8 and 10 not being shown, as it is shown in Figure 3.

Figure 3 is a bottom view of the structure shown in Figure 1, partly sectional, the sections being taken on the line 3—3 of Figure 1, the upper link assembly 7 and 9 not being shown, as it is shown in Figure 2.

Figure 4 is similar to Figure 1, except that it is partly sectional, the sections being taken on the line 4—4 of Figure 2, and parts thereof are shown in relatively different positions.

Figure 5 is a front elevation of a pivotally connected actuating mechanism for selectively producing straight line motion in the full length of a movable member, or for producing therein convex, or concave, circular motion, showing the adjustment for a straight line motion.

Figure 6 is a plan view of the structure shown in Figure 5, partly sectional, the sections being taken on the line 5—5, and also represents a bottom view of the structure shown in Figure 5, partly sectional, the sections being taken on the line 6—6.

Figure 7 is similar to Figure 5 except that it is shown adjusted to produce concave circular motion.

Figure 8 is similar to Figure 5 except that it is shown adjusted to produce a convex circular motion.

In the drawings, wherein for the purpose of illustration is shown a preferred embodiment of my invention, the numeral 6 designates a frame supporting member, the said frame supporting member being bifurcated at the end, having a substantially U shaped opening for the reception of a spring and an upper and a lower fork arm each being horizontally apertured for the reception of the pivot pins 17 and 18.

Link 7 is bifurcated to form two arms, the said arms being disposed about the upper fork arm 6, each being horizontally apertured for the reception of the pivot pins 17, its opposite end being apertured for the reception of the pivot pin 19.

Link 8 is bifurcated to form two arms, the said arms being disposed about the lower fork arm 6, each being horizontally apertured for the reception of the pivot pins 18, its opposite end being apertured for the reception of the pivot pin 20.

The two vertical links 13, positioned between the links 7 and 9 and 8 and 10 respectively, are horizontally apertured at their ends for the reception of the pivot pins 19 and 20.

Link 9 is substantially U shaped having two arms, the said arms being vertically slotted at their ends for the reception of the upper fork arms 12 and being horizontally apertured for the reception of the pivot pins 21, its opposite end being disposed about the upper ends of the links 13 and of the link 7 and being apertured for the reception of the pivot pin 19.

Lever link 10 is bifurcated at one end to form two arms, the said arms being vertically slotted at their ends for the reception of the lower fork arms 12 and being horizontally apertured for the reception of the pivot pins 22, its central portion being apertured for the reception of the pivot pin 20 and disposed about lower ends of the links 13 and of the link 8, its opposite end being of a substantially triangular shape, having a vertically slotted end for the reception of the pin 14 and being horizontally apertured for the reception of the pivot pin 23.

Sliding pin 14 has vertically plane surfaces at one end to fit into the slotted end of the lever link 10, the said end being horizontally apertured for the reception of the pivot pin 23 and the remainder thereof made cylindrical for slidably mounting in the bearing 15.

Bearing 15 is preferably mounted at the center of the frame supporting member 6, being rigidly secured on the under side thereof and horizontally apertured for the reception at each end thereof of a sliding pin 14, one end thereof being for the accommodation of an opposite installation, it being understood that this specification describes one wheel suspension only, there being sufficient space between the said pin ends to prevent their contacting. When necessary, other suitable means may be provided for mounting the said bearing 15.

Wheel supported member 12, having two upper and two lower arms to fit into the slotted ends of the links 9 and 10 respectively, the said arms being horizontally apertured to receive the pivot pins 21 and 22 and a recessed seat for the lower end of the spring 16 to bear upon, is constructed with relatively more width and strength from the lower part of the spring seat upwardly and of relatively less width from the spring seat downwardly to provide great strength above as required and ample room for steering arms below.

While the steering knuckle is not a part of my invention and no claims are made therefor, there is shown in the drawings one type of a well known steering knuckle, inserted in a bifurcation between the upper and lower arms provided therefor, the said arms being apertured to receive a steering pin, which is pivotally inserted therein, the said steering pin passing through an aperture in a spindle body and being rigidly secured thereto by taper pins through the said spindle body bearing on the said steering pin.

It is understood, however, that other types of steering knuckles may be used and other means provided for attaching the same to the wheel supported member 12.

It is understood, that for non-steerable wheels the spindle body may be rigidly secured to the wheel supported member 12, with any suitable means, or the steering knuckle may be eliminated and a stub axle, or spindle, be bolted, or otherwise rigidly attached to the wheel supported member 12, or constructed integrally therewith.

In assembling my invention, a convenient method is to progressively, in Figures 3 and 4 of the drawings, securely bolt the bearing 15 to the frame supporting member 6; attach the link 8 and the links 13 to the lever link 10 with the pin 20 and secure the said pin 20 rigidly to the lever link 10 with taper pins, or bolts, provided therefor; attach the sliding pin 14 to the lever link 10 with the pin 23 and secure the pin 23 rigidly to the lever link 10 with taper pins, or bolts, provided therefor; insert the pin 14 in the bearing 15, attach the link 8 to the frame supporting member 6 with the pin 18 and secure the pin 18 rigidly to the lever link 10 with taper pins, or bolts, provided therefor; in Figures 2 and 4 of the drawings, attach the link 7 to the frame supporting member 6 with the pin 17 and secure the pin 17 rigidly to the link 7 with taper pins, or bolts, provided therefor; attach the links 13 and the link 9 to the link 7 with the pin 19 and secure the pin 19 rigidly to the link 9 with taper pins, or bolts, provided therefor; attach the wheel supported member 12 to the link 9 with the pins 21 and secure the pins 21 rigidly to the link 9 with taper pins, or bolts, provided therefor; in Figures 3 and 4 of the drawings, attach the wheel supported member 12 to the lever link 10 with the pins 22 and secure the pins 22 rigidly to the lever link 10 with taper pins, or bolts, provided therefor; finally, insert the spring 16 between its lower seat in the wheel supported member 12 and its upper seat in the frame supporting member 6 provided therefor.

To disassemble my invention reverse the above proceeding.

As previously stated, the steering knuckle is not a part of my invention, but is of a well known type, the assembling of which is well understood.

In more fully describing the means for producing the said straight line wheel action substantially perpendicular to the base of the vehicle,—

In Figure 1, with all movable parts shown in an intermediate position, it will be seen that the center of the pivot pins 18, 22, 20 and 23 lie in the same horizontal plane, which said plane I will take as a base, and that the pivot pins 18, 22, 17 and 21 lie in the same plane perpendicular to the said base.

In Figure 4, it will be seen that as the pivot pin 22 moves upwardly with the wheel supported member 12, the lever link 10 being fulcrumed on the pin 23 in the seat 14, that the pivot pin 20, being centrally located between the pins 22 and 23, will, with its dependents, be forced upwardly from the base one half the distance and at one half the velocity of the pin 22. Link 8, being attached to the lever link 10 at the pivot pin 20 and having the same distance between its pivotal centers 18 and 20 as those of the lever link 10 between 22 and 20 and between 20 and 23, will at any position form the same angle to the base, but in an opposite direction as that of the lever link 10. Link 8 being pivotally attached at the pin 18 to a relatively fixed member 6, and having the pin 18 as a center, the pivot pin 20, at its opposite end will travel in a counterclockwise arc from the horizontal base. Lever link 10, being pivotally attached to the link 8 at the pin 20, the pin 22 will travel in a clockwise arc with the point 20 as a center, as the slotted pin 14 moves horizontally. Therefore, as the counterclockwise arc of the lever 8 at pin 20, with 18 as a center, equals that of the clockwise arc of the lever link 10 at 22, with 20 as a center, it will be seen that the pin 22 will at all points have its path in a straight line substantially perpendicular to the said horizontal base.

Or, with the centers 18 and 20 and 22 and 20 forming two sides respectively, of what, for explanatory purposes, I will designate a variable angle having its vertex at 20, it will be seen that, as 22 moves upwardly from 18 with the vertex 20 moving in unison therewith one half the distance and at one half the velocity of 22, the pin 22 will travel in a straight line perpendicular to the base.

It will be seen that as the pin 22 moves below the pin 18 the action above described is repeated in an opposite direction. It is therefore shown that the mechanism consisting of the link 8, the lever link 10 and the pin 14, together with their connections as described, is capable independently of producing a straight line travel in the pin pin 22 perpendicular to the base 18 and 23.

The upper link mechanism 7 and 9 is presumed to be the same as the lower link mechanism just described, having a bearing similar to 15 with any suitable mounting therefor, the upper and the lower link assemblies each functioning independently to produce a straight line travel substantially perpendicular to the said horizontal base to maintain the said wheel supported member 12 in its proper relation to the frame supporting member 6.

In my present disclosure, however, for purposes of economy in space and parts, I have connected the upper and the lower link assemblies by the links 13 in order to use the lever link 10 to actuate the upper links 7 and 9, as well as the lower link assembly 8 and 10 and to thereby eliminate the lever end of the link 9 together with its accessory parts.

In the herein described actuating mechanism for maintaining a reciprocally movable member in a straight path, if the pivotal connections on the upper and lower horizontally movable bearings 15 are moved inwardly, so that the distance between them is less than the distances between the upper and lower pivotal connections in the frame member and in the said reciprocally movable member, the reciprocally movable member will thereby be caused to travel in a convexed circle and if the said pivotal connections on the upper and lower bearings 15 are moved in the opposite direction the said reciprocally movable member will be caused to travel in a concaved circle.

In this specification one wheel suspension only is described, it being understood that its companion wheel suspension is similar, but constructed in the opposite direction, and one method is shown for connecting the said wheel suspension to its companion wheel suspension and to form a supporting member for an attachment to a vehicle frame, but as my invention is intended for use on a variety of vehicles and for other uses for which it is suitable, any other suitable means for attachment thereto may be employed.

I have shown the pivotal connections in my invention fitted with a commonly used type of pivotal pins and bushings, the said pivotal pins being secured in their relative positions by tapered pins, or tapered bolts, through tapered holes drilled therefor, the said tapered holes being drilled partly in the said pivotal pins and partly in the members to which they are rigidly attached. It is understood, however, that as my invention is intended for use on various kinds of vehicles, as well as other uses for which it is adaptable, the said pivotal pins, bushings and taper pins may have any of the well known equivalents substituted therefor, and that such changes as are necessary for adapting my invention to its various requirements without departing from the spirit of the invention may be made.

Having now described my invention and ascertained its function, what I claim is:

1. The combination in a wheel suspension, of a wheel supported member, for the mounting thereon of a wheel assembly, having a projecting spring seat, the said spring seat being recessed for the reception of the lower end of a coil spring, and having two upper and two lower fork arms, the said fork arms being curved inwardly to form parallel projections, the said projections being horizontally apertured for pivotal connections with a frame supporting member, having a substantially U shaped end for the reception of a coil spring and for a projecting spring seat projecting thereinto, and having an upper and a lower fork arm, the said fork arms being horizontally apertured for pivotal connections, the under side of the upper fork arm being recessed to form a seat for the upper end of a coil spring, the said frame supporting member extending inwardly to connect with a like opposite installation, its intermediate portion being for the mounting thereon and attachment thereto of vehicle frame members and attachment for centrally, on its under side, of a bearing, the said bearing having a horizontally movable seat mounted therein; and a link mechanism, for producing straight line motion perpendicular to a horizontal plane in the base of the vehicle in the upper and lower ends of the wheel supported member, having two pairs of links acting in opposite directions, one pair of the said links counteracting the action of the other pair of links, one pair of the said links each having one end horizontally pivotally connected to a relatively fixed frame supporting member, the other pair of links each having one end horizontally pivotally connected to the wheel supported member, the opposite ends of the said two pairs of links respectively being horizontally pivotally connected, and a pair of vertical links to horizontally pivotally connect the connected ends of the upper links to the connected ends of the lower links, the lower link, having one end connected to the wheel supported member, having an extension at its opposite end to horizontally pivotally connect with said horizontally movable seat to provide a lever to actuate and produce the said opposed motion in the said two pairs of links.

2. The combination in a mechanism for producing straight line, concave, or convex circular motion, of a relatively fixed frame, one end thereof having an upper and a lower fork arm, the said fork arms being horizontally apertured for pivotal connections, the said connections being in the same vertical plane, the opposite end of the said frame having upper and lower slotted projections, the upper and lower slots therein forming circular arcs about the said upper and lower pivotal connections respectively; with a vertically reciprocating member having upper and lower horizontal apertures for pivotal connections, the said connections being in the same vertical plane; and an upper link mechanism, to pivotally connect the upper end of the movable member to the upper arm of the fixed member and to produce a straight line travel in the upper pivotal connection of the movable member, having two links acting in opposite directions, one of the said links counteracting the action of the other said link, one of the said links having one end horizontally pivotally connected to the relatively fixed member, the other link having one end horizontally pivotally connected to the movable member, the opposite ends of the said links being horizontally pivotally connected, the link, having one end connected to the movable member, having an extension at its opposite end to horizontally pivotally connect with a horizontally movable seat and provide a lever to actuate, and produce the said opposed motion in, the said links, and a movable seat mounted in the upper slotted projections of the frame, to horizontally pivotally connect with and support the end of the actuating lever; and a lower link mechanism, like the said upper link mechanism, to similarly connect the lower end of the movable member to the lower arm of the fixed member and to similarly actuate the same, the upper and lower movable seats being mounted in the upper and lower circular slots for selectively adjusting the angle of the said upper and lower straight lines of travel, with relation to each other, to produce in the movable member a straight line of travel through its entire length perpendicular to a horizontal plane, or to produce therein a concave or a convex circular motion.

3. The combination and arrangement of parts in a mechanism for producing straight line motion in a pivotal connection, of a relatively fixed member, a link having one end pivotally connected to one end of the said relatively fixed member, its opposite end being pivotally connected intermediate of a lever-link, the said lever-link having one end pivotally connected to a movable seat, its opposite end having a pivotal connection to connect the said lever-link to a movable object, the distance between the intermediate pivotal connection and each of the two end pivotal connections in the said lever-link being equal to the distance between the pivotal connections in the first said link, the pivotal connections in the first said link and the pivotal connections in the said lever-link and the said movable seat being in the same plane, when the said mechanism is in an intermediate position, the said movable seat having its movement in the said plane and the said pivotal connection in the said opposite end of the lever-link having its movement in a plane at a right angle to the plane of the said movable seat.

4. The combination and arrangement of parts in a mechanism for producing straight line, or curvilinear motion in a reciprocally movable member, of a relatively fixed member, a reciprocally movable member, a link mechanism for pivotally connecting one end of the said reciprocally movable member to one end of the said relatively fixed member, the said link mechanism consisting of a link having one end pivotally connected to one end of the said fixed member, its opposite end being pivotally connected intermediate of a lever-link, the said lever-link having one end pivotally connected to one end of the said reciprocally movable member, its opposite end being pivotally connected to a movable seat, the said movable seat being mounted in a bearing, the said bearing being adjustably mounted in a slotted projection on one end of the said relatively fixed member, the said slotted projection forming a circular arc about the said pivotal connection in the said fixed member, the distances between the intermediate pivotal connection and each of the end pivotal connections in the said lever-link being equal to the distance between the pivotal connections in the first said link, and a link mechanism, like the first said link mechanism, to similarly actuate and pivotally connect the opposite end of the said reciprocally movable member to the opposite end of the said relatively fixed member, the pivotal connections in the said relatively fixed member and the pivotal connections in the said reciprocally movable member being in the same plane, the pivotal connections and the movable seat in the first said link mechanism being in the same plane and at a right angle to the first said plane, and the pivotal connections and the movable seat in the last said link mechanism being in the same plane and at a right angle to the first said plane when the said mechanism is in an intermediate position, the movement of the first and last said movable seats being in the second and last said planes respectively, the said bearings being intermediately, outwardly, or inwardly adjustable in the said slotted arcs to produce respectively the said straight line motion in the said reciprocally movable member, the first and last said pivotal connections in the said reciprocally movable member being movable at right angles, respectively, to the planes of the first and last said movable seats.

5. In a motor vehicle, the combination with a vehicle frame, of steerable road wheels disposed at opposite sides of said frame, and means supporting said road wheels on said frame for independent rising and falling movement with respect thereto, said means comprising a pair of vertically spaced links having articulated connection with each of said wheels and with said frame for swinging movement in generally vertical planes, said links extending inwardly from the road wheel and being supported for swinging movement about substantially parallel axes, the connection of one link of each pair with the frame providing for lateral bodily displacement of the link, and means acting between the frame and each of said last named links for guiding the latter to effect lateral outward displacement thereof to an extent varying with and determined by the extent of swinging movement of the links from a mid position.

6. In a motor vehicle, the combination with a vehicle frame, of a road wheel, a road wheel carrying member, and means supporting said road wheel on said frame for rising and falling movement with respect thereto, said means comprising a pair of vertically spaced links carried by said frame and pivotally connected with said wheel carrying member, and a mounting supporting one of said links on said frame for concurrent generally vertical swinging movement and bodily lateral displacement, said links extending inwardly from the road wheel and being supported for swinging movement about substantially parallel axes, and means guiding said last named link to effect lateral displacement thereof to an extent sufficient to prevent excessive tire scuffing.

7. In a motor vehicle, the combination with a vehicle frame, of a road wheel, a road wheel carrying member, and means supporting said road wheel on said frame for rising and falling movement with respect thereto, said means comprising a pair of vertically spaced links having articulated connection with said wheel carrying member and fulcrumed on said frame, said links extending inwardly from the road wheel and being supported for swinging movement about substantially parallel axes, and means associated with said frame and one of said links for effecting outward lateral displacement of the fulcrum of the latter as the wheel rises and falls to an extent sufficient to prevent excessive scuffing of the tire.

8. In a motor vehicle, the combination with a vehicle frame, of a road wheel, a road wheel carrying member, and means supporting said road wheel on said frame for rising and falling movement with respect thereto, said means comprising a pair of vertically spaced links carried by said frame and pivotally connected with said wheel carrying member, and a mounting supporting one of said links on said frame for concurrent generally vertical swinging movement and bodily lateral displacement, said mounting including a member carried by said frame for free displacement laterally thereof, said member being pivotally connected with the inner end of said link, and a member pivoted to said link and outwardly thereof to said frame, said link and last named member having the pivotal connections therefor disposed substantially in a common, generally horizontal plane in the mid position of said link.

9. In a motor vehicle, the combination with a vehicle frame, of a road wheel, a road wheel carrying member, and means supporting said road wheel on said frame for rising and falling movement with respect thereto, said means comprising a pair of vertically spaced links carried by said frame and pivotally connected with said wheel carrying member, and a mounting supporting one of said links on said frame for concurrent generally vertical swinging movement and bodily lateral displacement, said mounting including a member carried by said frame for free displacement laterally thereof, said member being pivotally connected with the inner end of said link, and a member pivoted to said link and outwardly thereof to said frame, said link and last named member having the pivotal connections therefor disposed substantially in a common, generally horizontal plane in the mid position of said link, the said pivotal axes being approximately equally spaced as measured laterally.

10. The combination in a wheel suspension, of a wheel supported member, with a frame supporting member having an end shaped for the reception of a coil spring, and for a lower spring seat projecting thereinto from said wheel supported member, the said frame supporting member having an upper and a lower fork arm, the said fork arms being apertured for pivotal connections, the underside of the upper fork arm providing a seat for the upper end of a coil spring, the said lower fork arm being tapered toward its end to provide clearance for a steering arm, a link mechanism for pivotally connecting the said wheel supported member to the said frame supporting member that will maintain the wheel supported member in a straight line travel in its full length perpendicular to a horizontal plane, and a spring mounted on the said wheel supported member and bearing on the seat of said frame supported member to flexibly sustain its load.

11. In the combination in a wheel suspension having a wheel supported member, a frame supporting member, and a spring mounted on the said wheel supported member and bearing upwardly on the said frame supporting member; means for pivotally connecting the said wheel supported member to the said frame supporting member that will maintain the said wheel supported member in a straight line of travel in its road action, substantially perpendicular to a horizontal plane in the base of the vehicle to which it is attached, the said means consisting of two upper links, one of which is horizontally pivotally connected at one end to the upper end of the said frame supporting member, the other said link having one end horizontally pivotally connected to the upper end of the said wheel supported member, the opposite ends of the said links being horizontally pivotally connected, of two lower links, one of which is horizontally pivotally connected at one end to the lower end of the said frame supporting member, the other said lower link having one end horizontally pivotally connected to the lower end of the said wheel supported member, the opposite ends of the said lower links being horizontally pivotally connected, that one of said lower links which has one end pivotally connected to the lower end of the said wheel supported member, being extended at its opposite end to form a lever, a horizontally movable seat to which said lever is pivoted to actuate the said upper and lower links, and a pair of vertical links having their upper and lower ends pivotally connecting the connected ends of the upper links with the connected ends of the lower links, said horizontally movable seat being mounted on the underside of the frame supporting member in the horizontal plane of its lower pivotal connection.

12. The combination in a wheel suspension, of a wheel supported member having a projecting spring seat with a frame supporting member, means for horizontally pivotally connecting the wheel supported member to the frame supporting member that will maintain the upper and lower ends of the wheel supported member in a straight line travel perpendicular to a horizontal plane in the base of the vehicle; and a coil spring having its lower end mounted on the projecting spring seat and its upper end bearing on the frame supporting member to flexibly sustain its load.

13. The combination and arrangement of parts in an actuating mechanism, of a relatively fixed member, a vertically reciprocally movable member, a link having one end pivotally connected to the said fixed member, a lever link having the opposite end of said link intermediately pivotally connected thereto, said lever link having one end pivotally connected to the said vertically reciprocally movable member, a horizontally movable seat to which the opposite end of the lever link is pivotally connected, the distances between the intermediate pivotal connection and the two end pivotal connections of said lever link each being equal to the distance between the pivotal connections of the first mentioned link, the said pivotal connections in the fixed member and in the vertically reciprocally movable member being in the same vertical plane, said horizontally movable seat being mounted on the said fixed member opposite to, and in the horizontal plane of, the pivotal connection therein, the said actuating mechanism maintaining the reciprocally movable member in its pivotal connection, in a straight line of travel perpendicular to a horizontal plane.

14. The combination in an actuating mechanism for producing straight line motion perpendicular to a horizontal plane in the full length of a movable member and for pivotally connecting the same to a relatively fixed member, of a lower link mechanism having a link having one end horizontally pivotally connected to the lower end of the said fixed member, a lever link to the intermediate portion of which the opposite end of said link is pivotally connected, said lever link having one end horizontally pivotally connected to the lower end of the said movable member, a horizontally movable seat to which the other end of said lever link is pivotally connected, the distances between the intermediate pivotal connection and the two end pivotal connections of said lever link each being equal to the distance between the pivotal connections of the first-mentioned link, the said pivotal connections in the fixed member and in the movable member being in the same vertical plane, the said horizontally movable seat being mounted on the said fixed member opposite to, and in the horizontal plane of, the pivotal connection therein; with an upper link mechanism having a link having one end horizontally pivotally connected to the upper end of the fixed member and a link having one end horizontally pivotally connected to the upper end of the movable member, the opposite ends of the said links being horizontally pivotally connected, the said pivotal connections in the fixed member and in the movable member being in the same vertical plane and in the same vertical plane of similar connections in the lower link mechanism, the said links having the same pivotal lengths as the lower link and the link end of the lever link; and a pair of vertical links to horizontally pivotally connect the pivotal connection of the upper links to the pivotal connection of the lower links.

15. The combination and arrangement of parts in an actuating mechanism, of a relatively fixed member, a member reciprocally movable with relation to the said fixed member, and an upper and lower like link mechanism for pivotally connecting the upper and lower ends of the said fixed member with the upper and lower ends respectively of the reciprocally movable member that will maintain the said reciprocally movable member in its upper and lower ends, in a straight line of travel perpendicular to a horizontal plane, each of said upper and lower link mechanisms acting independently of the other to produce a straight line travel in its pivotal connection with the reciprocally movable member, each of the said upper and lower link mechanisms consisting of a link having one end horizontally pivotally connected to one end of the said fixed member, a lever link to the intermediate portion of which the opposite end of the said link is connected and said lever link having one end horizontally pivotally connected to the said vertically reciprocally movable member, a horizontally movable seat to which the opposite end of said lever link is pivotally connected, the distances between the intermediate pivotal connection and the two end pivotal connections thereof each being equal to the distance between the pivotal connections of the first-mentioned link, the said horizontally movable seat being mounted on the said fixed member opposite to, and in the horizontal plane of, the pivotal connection therein.

16. A vehicle wheel suspension device comprising two sets of links, an articulated connection joining one end of at least one link of each set, means providing an articulated connection of the other end of one of said links with a relatively fixed member, means providing an articulated connection of the other end of the other one of said links with a relatively movable member, and means for guiding the movements of the sets of links.

17. A vehicle wheel suspension device comprising two sets of links, an articulated connection joining one end of at least one link of each set, means providing an articulated connection of the other end of one of said links with a relatively fixed member, means providing an articulated connection in the other end of the other one of said links with a relatively movable member, means for guiding the movements of the sets of links, and a spring mounted at its ends upon the respective relatively fixed and movable members to resist turning of the links at their articulated connections when the relatively movable member shifts in respect to the relatively fixed member.

18. A vehicle wheel suspension device comprising pairs of links disposed in plural sets, a common pivot for one end of each pair of links in the respective sets, means providing an articulated connection between the common pivots, a pivotal connection between the other end of each of one link of each pair with a relatively fixed member, a pivotal connection between the other end of each of the remaining link of each pair with a relatively movable member, and means for guiding the movements of the sets of paired links comprising a lever extension from one of the links pivotally connected with the relatively movable member, and means coupling the end of the lever extension with the relatively fixed member.

19. The combination in an actuating mechanism, of a relatively fixed member, a movable member, and means supporting said movable member on said relatively fixed member for guiding said movable member, in an articulated connection, in a substantially straight line path with relation thereto, the said means comprising a link having articulated connection at one end with said relatively fixed member, a lever link having articulated connection intermediate thereof with the opposite end of the first said link and one end of said lever link having articulated connection with the said movable member, its opposite end forming a lever to guide the movements of the said links at substantially like angles, but in opposite directions, from a mid position, the said articulated connections forming substantially parallel axes to permit swinging movement of the said links in generally parallel planes, the spacing of the said connections, in the link and in the lever link being equal, the said connections being substantially in the same plane when in a mid position, the path of the said movable member, in its said connection, and the said connection in the fixed member being in a plane at right angles to the first said plane, and means connecting the end of said lever with said fixed member for permitting swinging movement in said lever, and substantially straight line movement in said connection, at a right angle to the path of the movable member.

20. The combination in an actuating mechanism, of a relatively fixed member; a movable member; and means supporting said movable member on said fixed member, the said means comprising a plurality of generally parallel links, each having articulated connection at one end with the said fixed member, the opposite ends having articulated connection with a common connector, a plurality of generally parallel links, each having articulated connection at one end with the said common connector and extending, in their mid positions, in the general direction of, and parallel to, the first said links, the opposite ends having articulated connection with said movable member, the spacing of said connections in all said links being equal, the said articulated connections forming substantially parallel axes to permit swinging movement of said links in generally parallel planes, the said connections, in the relatively fixed member, the first and second said connections in the common connector and the connections in the movable member all being in parallel planes, and means for guiding the movements of the first said links and the last said links at like angles, but in opposite directions, from a mid position, the movement of the first said links offsetting the movement of the last said links for guiding the movement of the said movable member in a straight line path.

21. The combination in an actuating mechanism, of a relatively fixed member; a movable member; and means supporting said movable member on said fixed member, the said means comprising a plurality of generally parallel links, each having articulated connection at one end with the said fixed member, the opposite ends having articulated connection with a common connector, a plurality of generally parallel links, each having articulated connection at one end with the said common connector and extending, in their mid positions, in the general direction of, and parallel to, the first said links, the opposite ends having articulated connection with the said movable member, the spacing of said connections in all said links being equal, the said articulated connections forming substantially parallel axes to permit swinging movement of said links in generally parallel planes, the said connections, in the relatively fixed member, the first and second connections in the common connector and the connections in the movable member all being in parallel planes, means for guiding the movements of the first said links and the last said links at like angles, but in opposite directions, from a mid position, the movement of the first said links offsetting the movement of the last said links for guiding the movement of the said movable member in a straight line path, the said means comprising the extension from its connector connection of at least one of the said links which has connection with the movable member to form a lever for guiding the said links as described, and means connecting said lever with said fixed member to permit swinging movement therein and straight line movement in said connection at right angles to the path of the said movable member.

22. The combination in an actuating mechanism, of a relatively fixed member; a relatively movable member; and means supporting said movable member on said fixed member, the said means comprising a pair of generally parallel links, each having pivotal connection at one end with the said relatively fixed member and their opposite ends having pivotal connection with a common connector, and at least one link having pivotal connection in its intermediate portion with the said common connector and extending, in its mid position, in the same general direction of, and parallel to, the first said links and having pivotal connection with the said movable member, the first and last said links having even pivotal lengths, the said pivotal connections forming substantially parallel axes for permitting swinging movement of the said links in generally parallel planes, the last said link being extended from its intermediate connection to form a lever to guide the first and last said links at substantially like angles, but in opposite directions, from a mid position, for guiding the said movable member in a straight line path, and means connecting the said lever to the said fixed member for permitting swinging movement in said link, and movement in the said connection, in a substantially straight line path at right angles to the path of the said movable member.

23. The combination in an actuating mechanism, of a relatively fixed member; a relatively movable member; and means supporting said movable member on said fixed member, the said means comprising a pair of generally parallel links, each having pivotal connection at one end with the said relatively fixed member and their opposite ends having pivotal connection with a common connector, and at least one link having pivotal connection with the said common connector and extending, in its mid position, in the same general direction of, and parallel to, the first said links, the first and last said links having even pivotal lengths, the said pivotal connections forming substantially parallel axes for permitting swinging movement of the said links in generally parallel planes; and means for guiding the movements of the first and last said links at substantially like angles to, but in opposite directions from, a mid position, the swinging movements of the first said links offsetting that of the last said link for guiding the said movable member in a straight line path in its pivotal connection.

24. The combination and arrangement of parts in a mechanism for guiding a movable object, in an articulated connection, in a straight line path, of a relatively fixed member, a link having articulated connection at one end to said relatively fixed member, a lever link having articulated connection intermediate thereof with the opposite end of the first said link, one end of said lever link having articulated connection with said movable object, the opposite end of the lever link forming a lever; and means connecting the opposite end of the said lever link to said relatively fixed member for permitting swinging movement therein and substantially straight line movement in said connection at a right angle to the path of the connection in the said movable object, the said articulated connections forming substantially parallel axes for permitting swinging movement at substantially like angles to, but in opposite directions from, a mid position in the said lever and lever link, the movement of each link offsetting the movement of the other link for guiding the said movable object, in the said articulated connection, in the said straight line path.

25. In an actuating mechanism for producing substantially straight line movement in a movable member, the combination of a relatively fixed member; a relatively movable member; and means supporting said movable member on said fixed member for guiding said movable member in a substantially straight line path with relation thereto, the said means comprising a pair of links having articulated connection at one end and extending in the same general direction therefrom, and being substantially parallel, when in a mid position, the opposite ends of the said links having articulated connections respectively with the said fixed member and the said movable member; and means for guiding the said links at substantially like angles to, but in opposite directions from a mid position, the said means comprising a link having articulated connection with said fixed member and extending in the same general direction of, and being substantially parallel to, the first said links when in a mid position, and means providing articulated connection between the first and last said links, the said articulated connections forming substantially parallel axes to permit swinging movement in the said links in generally parallel planes.

26. The combination in an actuating mechanism for providing movement in a member selectively in a straight line, or concave, or convex arcuate path, of a relatively fixed member; a relatively movable member, means connecting one end of said movable member with said fixed member for providing independent movement therein in a straight line path; means similarly connecting the opposite end of said movable member to said fixed member for providing independent movement therein in a straight line path, the said means each comprising articulated connections between the said fixed member and the said movable member; and means for selectively adjusting the two said means with relation to each other for guiding the movement of the said movable member in the said straight line, concave, or convex arcuate path.

JAMES JUDSON CHAPMAN.